(12) United States Patent
Nakamoto et al.

(10) Patent No.: US 8,657,995 B2
(45) Date of Patent: Feb. 25, 2014

(54) METHOD OF PRODUCING RECYCLED PAPER PULP FROM WASTE PRINTED PAPER AS RAW MATERIAL

(75) Inventors: Yoshinori Nakamoto, Hiroshima (JP); Masato Nomura, Higashihiroshima (JP)

(73) Assignee: Tech Corporation Co., Ltd., Hiroshima-shi (JP)

( * ) Notice: Subject to any disclaimer, the term of this patent is extended or adjusted under 35 U.S.C. 154(b) by 0 days.

(21) Appl. No.: 12/848,493

(22) Filed: Aug. 2, 2010

(65) Prior Publication Data

US 2011/0030907 A1     Feb. 10, 2011

(30) Foreign Application Priority Data

Aug. 6, 2009   (JP) ................................. 2009-183512
Jun. 24, 2010   (JP) ................................. 2010-143640

(51) Int. Cl.
*D21B 1/32*     (2006.01)
*D21C 5/02*     (2006.01)

(52) U.S. Cl.
CPC ................ *D21C 5/025* (2013.01); *D21B 1/327* (2013.01); *D21B 1/32* (2013.01); *D21C 5/027* (2013.01)
USPC ........................................ 162/4; 162/5; 162/8

(58) Field of Classification Search
USPC ........................................................ 162/4–8
See application file for complete search history.

(56) References Cited

U.S. PATENT DOCUMENTS

| | | | |
|---|---|---|---|
| 2,872,313 A * | 2/1959 | House et al. ...................... 162/6 |
| 5,238,538 A * | 8/1993 | Jagannadh et al. ........... 205/690 |
| 5,259,969 A * | 11/1993 | Srivatsa et al. .................. 252/60 |
| 5,340,439 A * | 8/1994 | Markham et al. ................. 162/5 |
| 6,013,157 A * | 1/2000 | Li et al. ............................. 162/5 |
| 2009/0081077 A1* | 3/2009 | Sawada .......................... 422/37 |

FOREIGN PATENT DOCUMENTS

JP     10-506155     6/1998

OTHER PUBLICATIONS

Smook, Handbook for Pulp and Paper Technologists, 1992, Angus Wilde Publications, 2nd edition, chapters 13 and 14.*
Mountain Empire Community College, Chlorine Chemistry, downloaded online May 15, 2012, downloaded from http://water.me.vccs.edu.*

\* cited by examiner

*Primary Examiner* — Anthony Calandra
(74) *Attorney, Agent, or Firm* — Kratz, Quintos & Hanson, LLP

(57) ABSTRACT

[Object] It is to provide a process of manufacturing recycled paper pulp with high efficiency from newspaper (waste paper) or waste printed paper as a raw material, which is disposed and recovered from homes and offices, through a deinking process using a specific surfactant and electrolyzed water.
[Solving Means] A process of obtaining recycled paper pulp from waste printed paper such as waste newspaper as a raw material, including the steps of: cutting waste newspaper or waste printed paper into small pieces; adding alkaline electrolyzed water to the small pieces of waste paper such as waste newspaper, wherein the alkaline electrolyzed water is obtained by electrolysis of water containing a small amount of refined salt; stirring them at a high speed to break down the waste newspaper into fibers; adding the waste newspaper fibers to a stirring vessel; adding an appropriate amount of a liquid surfactant thereto; and then removing ink released to the surface of the solution under gentle stirring, wherein the liquid surfactant is sodium linear alkylbenzene sulfonate.

1 Claim, 3 Drawing Sheets

Fig. 3

| | The pH of Maceration Solution | The pH of Pulp | Pre-Water -Washing pH (*1) | Post-Water -Washing pH (*2) | Post-Water -Washing pH (2)(*3) | Post-Water -Washing pH (3) (*4) | Whiteness |
|---|---|---|---|---|---|---|---|
| Acidic Electrolyzed Water | 2.88 | 6.73 | 7.23 | 8.68 | 8.2 | 7.5 | 61.52 |
| Alkaline Electrolyzed Water | 10.98 | 11.03 | 7.23 | 9.49 | 8.2 | 7.5 | 63.73 |
| Tap water | 7.23 | 8.82 | 7.23 | 8.85 | 7.68 | 7.1 | 59.16 |

(*1) Pre-water-washing pH: the pH of rinse water (tap water) before it is used to wash the pulp.

(*2) Post-water-washing pH: the pH of rinse water (tap water) after it is used to wash the pulp for the first time.

(*3) Post-water-washing pH (2): the pH of rinse water (tap water) after it is used to wash the pulp for the second time.

(*4) Post-water-washing pH (3): the pH of rinse water (tap water) after it is used to wash the pulp for the third time.

METHOD OF PRODUCING RECYCLED PAPER PULP FROM WASTE PRINTED PAPER AS RAW MATERIAL

TECHNICAL FIELD

The present invention relates to a method of producing recycled paper pulp from waste printed paper as a raw material.

BACKGROUND ART

Conventionally, newspapers have been important prints for providing news on social events. In 2007, the newspaper circulation in Japan was about 50,000,000 per day. For newspapers in Japan, about 3,700,000 tons/year of paper has been used, and about 70 kg/year of paper has been consumed by one household.

In recent years, every papermaker has developed technology for recycling waste newspaper and reducing the weight of newspaper in order to produce eco-friendly paper in view of resource environment. In addition, newspaper collected by waste paper recyclers is turned into recycled paper pulp, and newsprint contains about 60 to 80% recycled paper.

On the other hand, the newsprint weight has been reduced, and it is currently 43 $g/m^2$. Recycled paper pulp includes dark, low-quality recycled paper pulp produced without removal of printed ink, which is used as a raw material for boards and corrugated boards; and pulp produced through removal of printed ink (internationally called deinked pulp (DIP)), which is used as a raw material for paper required to have whiteness, such as printing paper and toilet paper.

Recycled newsprint fibers still containing ink oil are also used as a raw material for bathroom or facial tissue, napkins, paper towels, and other products, for example, as disclosed in Patent Document 1.

PRIOR ART DOCUMENT

Patent Document

Patent Document 1: Japanese Patent Application National Publication (Laid-Open) No. 10-506155

The recycling mentioned above makes it possible to save wood resources, reduce load on waste collection and treatment and reduce manufacturing power consumption. Therefore, the recycling helps save energy, and it is consequently preferred to recycle paper in the same applications.

SUMMARY OF THE INVENTION

Object to be Achieved by the Invention

It is therefore an object of the present invention to provide a method of producing recycled paper pulp from waste printed paper such as waste newspaper as a raw material, which is capable of producing white recycled paper with high efficiency through a deinking process using specific electrolyzed water and surfactant in a process of manufacturing recycled paper pulp from newspaper (waste paper) or waste printed paper as a raw material disposed and recovered from homes and offices.

Means for Achieving the Object

According to the invention, means for achieving the object is a process of producing recycled paper pulp from waste newspaper or waste printed paper as a raw material, which includes: using alkaline electrolyzed water obtained by electrolysis of water containing a small amount of refined salt; and adding a liquid surfactant in a deinking process.

Effects of the Invention

According to the present invention, alkaline electrolyzed water obtained by electrolysis of water with salt is used in the process of stirring and macerating small pieces of waste newspaper or waste printed paper. Therefore, sodium hydroxide converted from the sodium generated is used in the process, and the chlorine residue is effectively used as a bleaching agent.

The remaining color of recycled paper, for which the original raw material is wood, is greatly attributed to the presence of lignin or denatured lignin, which causes browning of pulped fibers. However, alkaline electrolyzed water that is obtained by electrolysis with salt and used in the treatment as described above is effective in preventing a reduction in the strength of macerated fibrous pulp and in maintaining the strength and the like.

Combinations of alkaline electrolyzed water (among different types of electrolyzed water) and various surfactants have been examined. As a result, when the treatment is performed in the presence of a liquid surfactant (sodium linear alkylbenzene sulfonate) as described above, the surface of waste paper such as waste newspaper or any other waste printed paper is efficiently deinked, so that the desired white recycled paper can be obtained and other very advantageous effects can be produced.

BRIEF DESCRIPTION OF THE DRAWINGS

FIG. 3 is a diagram showing a comparison between an experiment according to the invention and other experiments.

EMBODIMENTS FOR CARRYING OUT THE INVENTION

Figure 1:
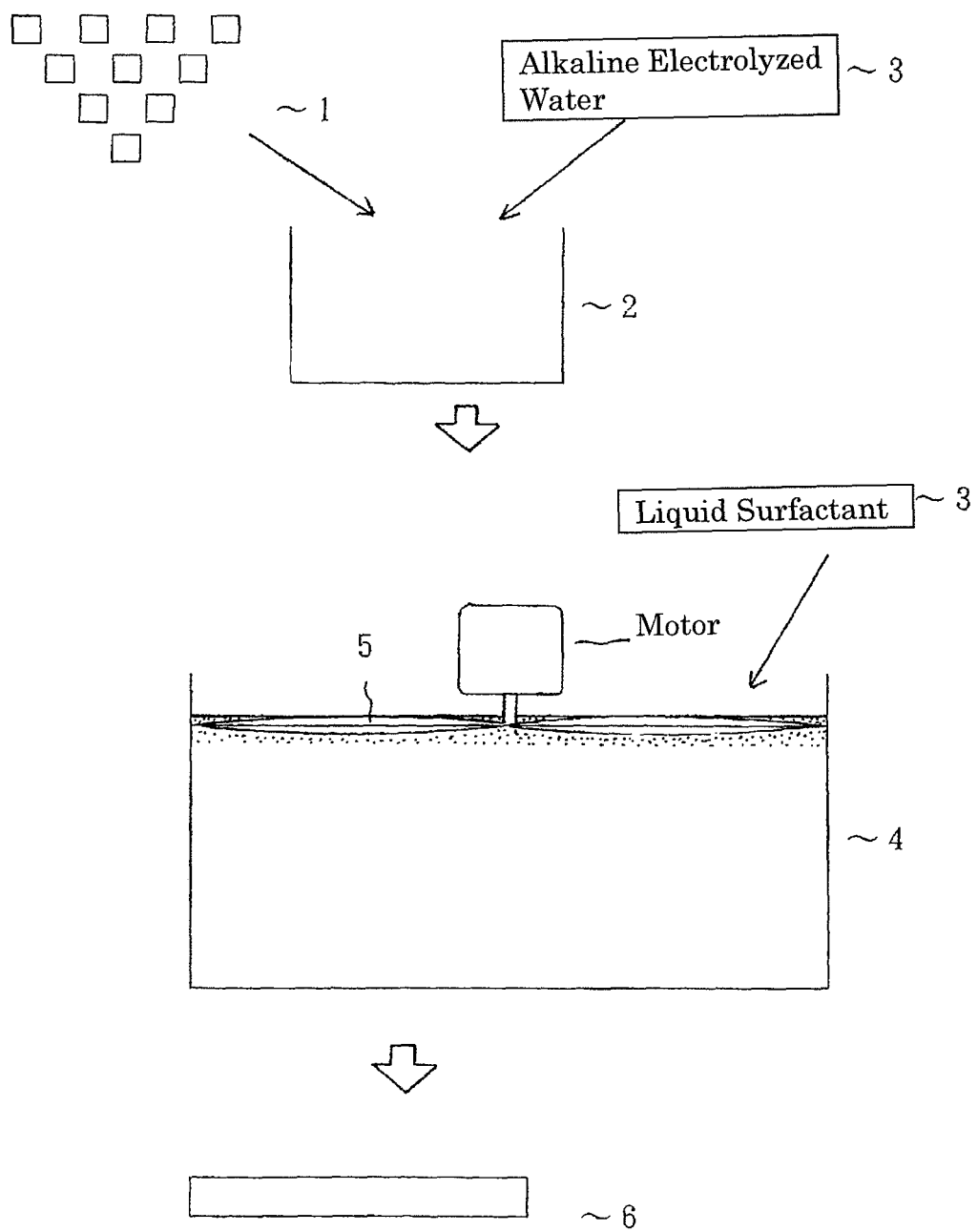
FIG. 1 is an explanatory diagram showing an example of the invention.
Figure 2:
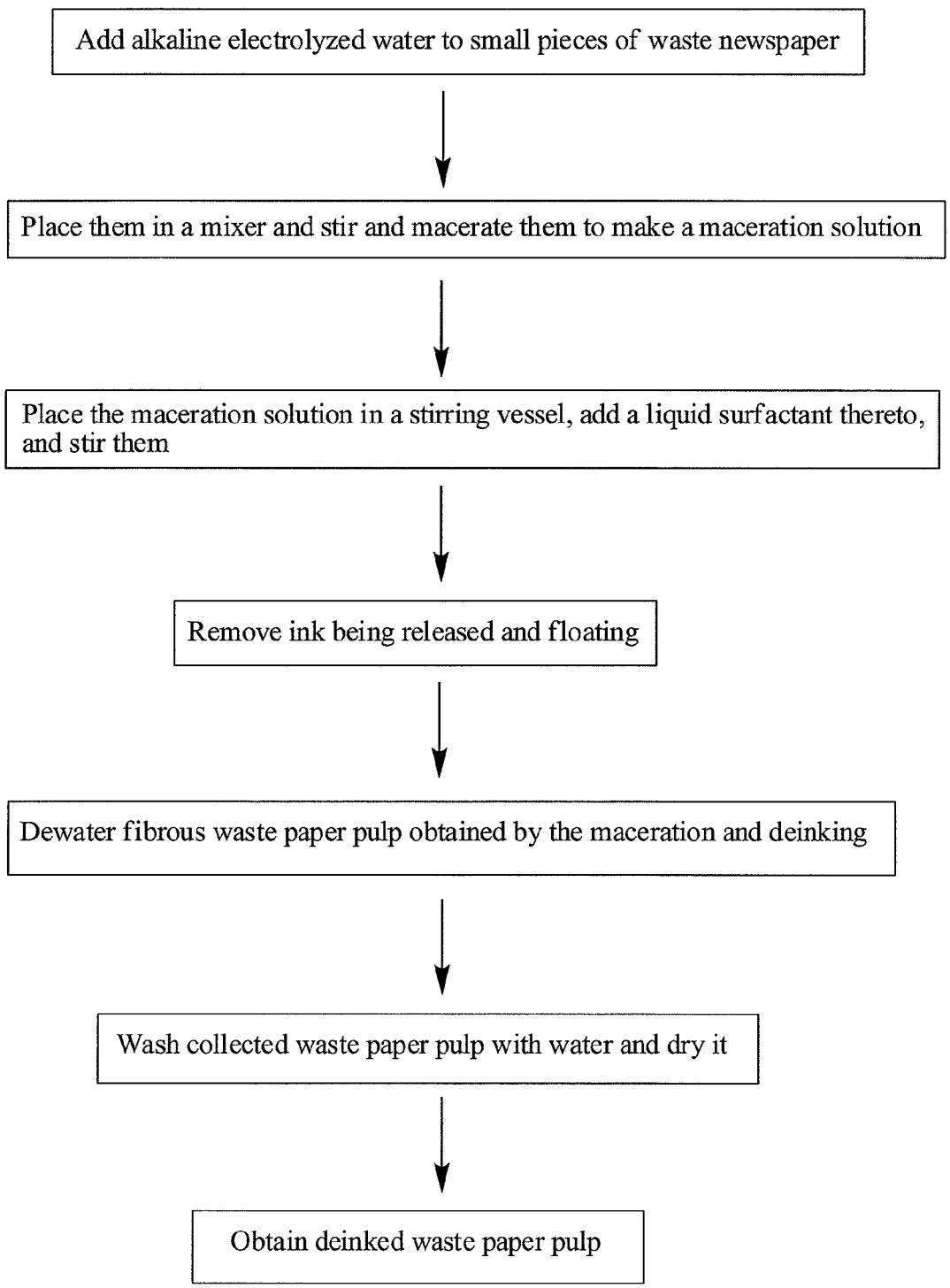
FIG. 2 is a flow chart showing an example of the invention.

Preferred embodiments of the invention are described below, which are directed to a method of producing recycled paper pulp from waste newspaper or waste printed paper as a raw material, including the steps of: breaking down waste paper such as waste newspaper into small pieces; adding alkaline electrolyzed water to the small pieces of waste paper, wherein the alkaline electrolyzed water is obtained by electrolysis of water containing a small amount of refined salt; stirring and macerating the small pieces of waste paper with the alkaline electrolyzed water in the presence of a liquid surfactant; and deinking the maceration solution.

EXAMPLES

The invention is described in detail below. An experiment was performed according to an example of the invention, which included the steps of: cutting waste newspaper into small pieces using a shredder or any other means; placing about 20 g (corresponding to four pages (54.5 cm wide×81.2 cm) of newspapers) of the small pieces of waste newspaper (1) in a mixer (2) and adding 1 liter of alkaline electrolyzed water (3) thereto; stirring them at a high speed to break down the waste newspaper into fibers; transferring the fiber-containing maceration solution to a 5-liter stirring vessel (4), then adding 4 milliliters of a liquid surfactant thereto and then gently stirring them; attaching a ragger (cord) to an impeller type stirring rod (5), wherein the ragger was a trial product made of gauze (40 cm square), and gently rotating the stirring rod (5) at a low speed (60 to 70 rpm) to remove ink being released and floating to the surface of the solution; replacing the ragger with a cleaned one 5 times or so, while observing how the ragger became soiled; then obtaining deinked pulp (6) of macerated waste paper fibers; dewatering (filtrating) the pulp; then washing the collected waste paper pulp with water (5 liters×3 times); then drying the pulp to obtain deinked waste paper pulp, so that 12.2 g (60.1% yield) of recycled paper was obtained.

The same process was performed on the same scale, except that acidic electrolyzed water was used in place of the alkaline electrolyzed water described above. However, lignin was not able to be efficiently removed by the treatment of the waste paper pulp with the acidic electrolyzed water, and the treatment was poor in the bleaching effect and had an adverse effect such as a reduction in pulp strength due to the effect of acid. The resulting recycled pulp was entirely slightly darkened and not as whitened as expected.

Recycled paper pulp was obtained using the process in the previous two paragraphs, except that tap water was used in place of the electrolyzed water (the alkaline water and the acidic water). As a result, the amount of the surfactant used had to be increased twice (8 milliliters) to improve the whiteness, and at the same time, a large amount of water had to be used for washing with water to remove the surfactant used. In addition, as the number of times of washing with water increased, the amount of the outflow of pulp fibers increased due to the effect of the remaining acid, so that the recycled paper pulp yield was reduced (to 20 to 40%).

Concerning the invention, combinations of alkaline electrolyzed water (among different types of electrolyzed water) and various surfactants were examined as described above. As a result, when the treatment was performed in the presence of a liquid surfactant (sodium linear alkylbenzene sulfonate), the surface of waste paper such as waste newspaper or waste printed paper was efficiently deinked, so that the desired white pulp fibers were obtained.

In order to increase the whiteness, the number of times of washing with water may be increased so that the ink deposited in the macerated pulp fibers can be removed. However, it became a cause of a reduction in the recycled paper yield.

On the other hand, when normal water (tap water) was used, the amount of the addition of the surfactant used had to be increased (0.0025%) to improve the whiteness of the waste paper pulp, and at the same time, a large amount of water was necessary for the removal of the surfactant used. As the number of times of washing with water increased, the amount of the outflow of pulp fibers increased due to the effect of the remaining acid, so that the recycled paper pulp yield was reduced (to 20 to 40%).

Thus, the disclosed method of producing recycled paper pulp from waste newspaper or waste printed paper as a raw material is preferably performed using alkaline electrolyzed water obtained by electrolysis with salt, and the recycled paper pulp can be used for toilet paper or other products not required to have a high level of whiteness. Thus, a treatment method enabling the production of recycled paper pulp materials has been developed.

It was also examined whether or not the initial waste water after the deinking treatment can be recycled. As a result, the addition of a cationic polymer flocculant makes flocculation and separation possible, so that environmental pollution can be prevented also in the waste water treatment.

An experiment on the deinking enhancing effect was performed using alkaline electrolyzed water (for use in the invention), acidic electrolyzed water, and tap water by the following procedure.

1. Recovered printed waste paper such as waste newspaper was cut into small pieces (about 5 cm×5 cm), which were divided into 5 g aliquots.

2. The cut pieces of the waste paper were placed in a mixer, into which 500 milliliters of acidic electrolyzed water, alkaline electrolyzed water or tap water was poured.

3. A surfactant (sodium linear alkylbenzene sulfonate) was used and added in an amount of 0.2 milliliters under the present conditions.

4. The materials were stirred in the mixer, so that three types of macerated and deinked waste paper pulp were obtained.

5. Five liters of tap water was placed in a 10-liter vessel, in which each resulting waste paper pulp was washed (washing was repeated three times, while the degree of soiling was checked).

6. Each product was dried using hot air at 100° C. for 10 minutes.

7. The whiteness of each resulting recycled paper was measured using a color-difference meter (COLOR-EYE 2020 manufactured by Gretag-Macbeth AG) and evaluated.

The results are shown in FIG. 3.

The whiteness was 63.73%, when alkaline electrolyzed water was used according to the invention. When acidic electrolyzed water and tap water were used respectively, the whiteness was 61.52% and 59.16%, respectively.

Based on the results, the following is concluded:

1. The whiteness was highest when the maceration and deinking process was performed using alkaline electrolyzed water, and the second highest and lowest values were obtained using acidic electrolyzed water and tap water, respectively.

2. It is considered that the highest whiteness was obtained using alkaline electrolyzed water, because for the micelle formation, the neutral surfactant added had a higher thermodynamic parameter on the alkaline side, so that the carbon particle-containing oil produced by deinking was well adsorbed and aggregated during the micelle formation.

3. It is considered that the whiteness obtained using acidic electrolyzed water was higher than that obtained using tap water, because the hypochlorous acid contained had a bleaching effect and the micelle formation by the neutral surfactant added partially proceeded on the acidic side.

4. As a result of a preliminary test, it is economically preferred to use tap water for washing of waste paper pulp.

5. It was demonstrated that it was necessary to add 0.2 milliliters/liter or more of a surfactant and the amount of the addition varied depending on the desired whiteness of recycled paper.

The experiment has demonstrated that the use of electrolyzed water in combination with a surfactant is effective in enhancing deinking. It is also concluded that the use of electrolyzed water makes it possible to reduce the amount of the surfactant used in the deinking process.

INDUSTRIAL APPLICABILITY

The present invention is industrially applicable for the establishment, implementation and sale of techniques for producing recycled paper from waste newspaper or waste printed paper as a raw material.

DESCRIPTION OF REFERENCE NUMERALS

1: Small pieces of waste newspaper
2: Mixer
3: Alkaline electrolyzed water
4: Stirring vessel
5: Impeller type stirring rod
6: Waste paper pulp What claimed is:

1. A method of producing recycled paper pulp from waste printed paper as a raw material, consisting of:
   cutting waste printed paper into small pieces;
   providing alkaline electrolyzed water obtained by electrolysis of water containing a small amount of refined salt;
   adding an appropriate amount of said alkaline electrolyzed water to the small pieces of waste printed paper;
   stirring the small pieces of waste printed paper and said alkaline electrolyzed water at a high speed to break down the small pieces of waste printed paper into fibers thereby forming a maceration solution;
   adding the maceration solution to a stirring vessel;
   adding an appropriate amount of sodium linear alkylbenzene sulfonate to the maceration solution; and
   then removing ink released to the surface of the maceration solution under stirring.

* * * * *